United States Patent
Farmer et al.

(10) Patent No.: US 6,345,441 B1
(45) Date of Patent: Feb. 12, 2002

(54) METHOD OF REPAIRING COMBUSTION CHAMBER LINERS

(75) Inventors: Gilbert Farmer, Cincinnati, OH (US); James Michael Caldwell, Alexandria, KY (US); Steven Allen Stiverson, Blanchester, OH (US); David Bruce Patterson, Mason, OH (US); Edward John Emilianowicz, West Chester, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/618,379

(22) Filed: Jul. 18, 2000

(51) Int. Cl.⁷ .............................................. B23P 15/00
(52) U.S. Cl. .................. 29/889.1; 29/889.2; 29/402.13
(58) Field of Search ................................ 29/889, 889.1, 29/889.2, 402.03, 402.08, 402.09, 402.11, 402.12, 402.13

(56) References Cited

U.S. PATENT DOCUMENTS 5,430,935 A * 7/1995 Yaworsky et al. ......... 29/889.1
5,839,643 A * 11/1998 Inoue et al. ................. 228/119
6,049,978 A * 4/2000 Arnold ....................... 29/889.1
6,163,959 A * 12/2000 Arratiz et al. ............. 29/889.1

\* cited by examiner

Primary Examiner—I Cuda Rosenbaum
(74) Attorney, Agent, or Firm—Andrew C. Hess; David L. Narciso

(57) ABSTRACT

A method of repairing an annular transpiration cooled liner for a combustion chamber of a gas turbine engine. An annular portion of the liner including a damaged region is removed from between an upstream section and a downstream section of the liner. Sheet metal is formed into an annular replacement section having at least one axial seam extending between an upstream end and a downstream end of the replacement section. The replacement section is sized and shaped similarly to the removed annular portion of the liner. The upstream end of the formed annular section is joined to the upstream section of the liner and the downstream end of the formed annular section is joined to the downstream section of the liner.

8 Claims, 4 Drawing Sheets

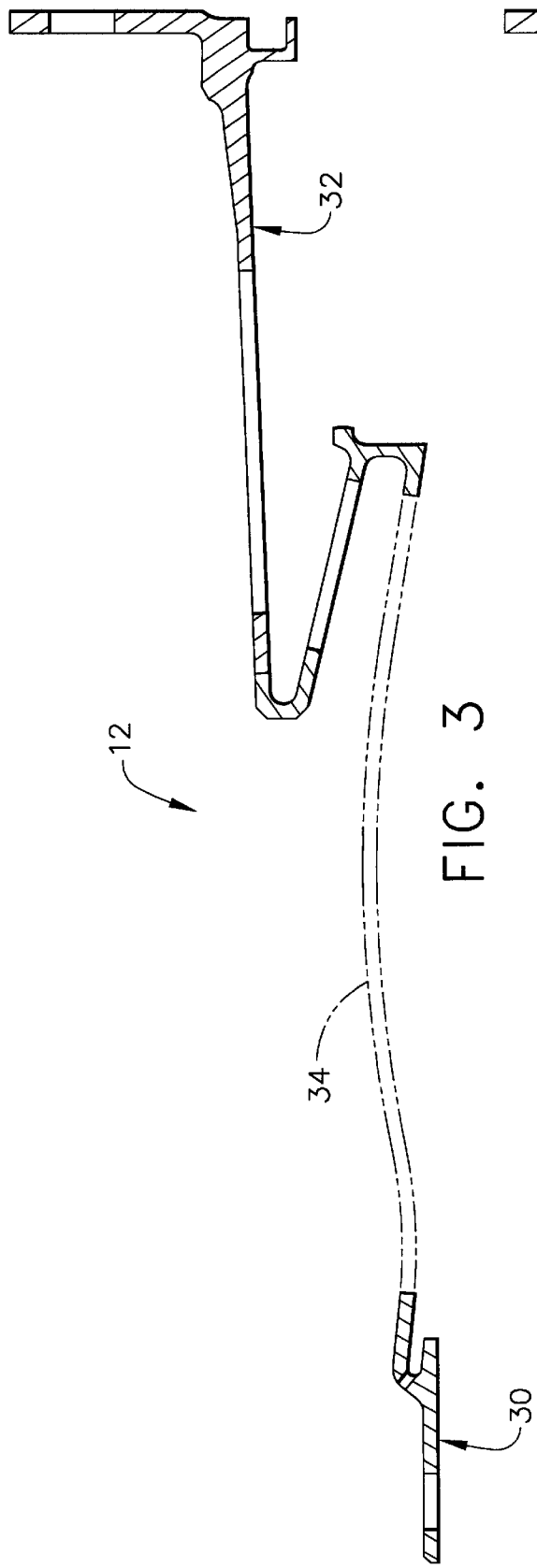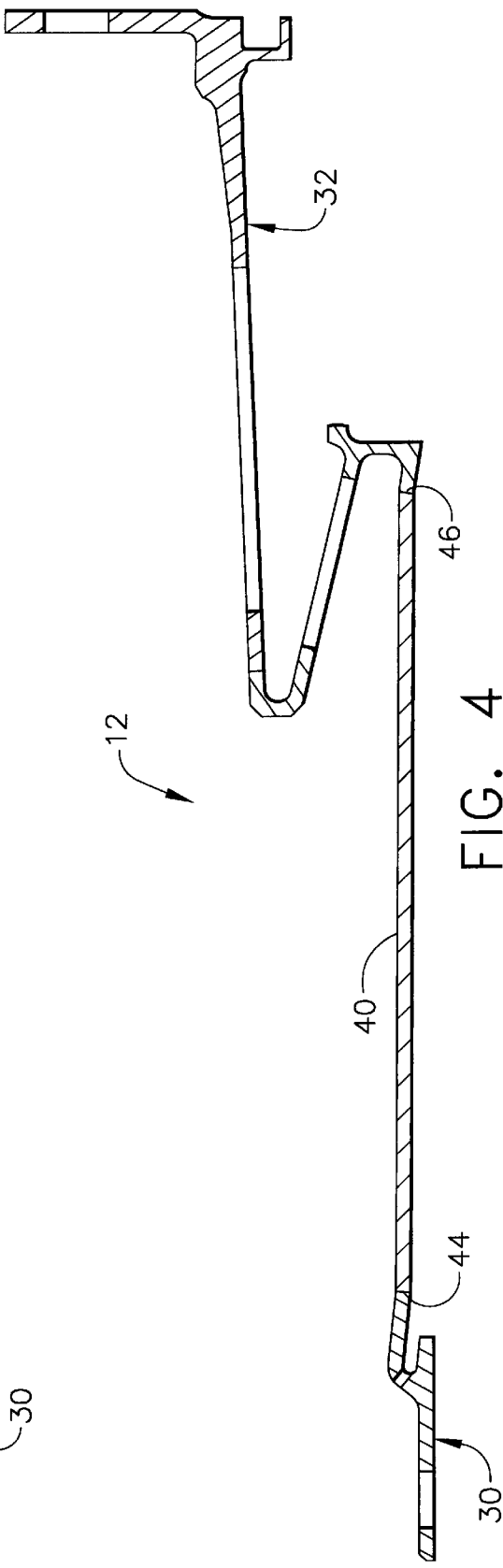

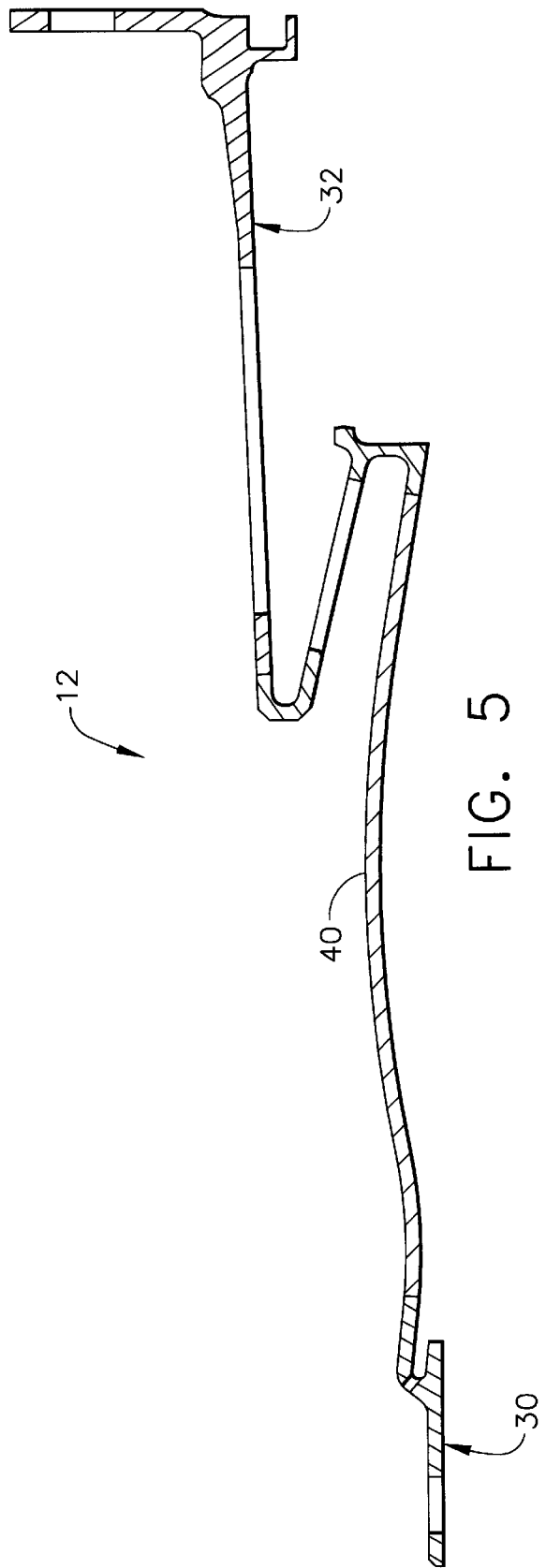

METHOD OF REPAIRING COMBUSTION CHAMBER LINERS

BACKGROUND OF THE INVENTION

The present invention relates generally to combustion chamber liners and more particularly to a method of repairing damaged transpiration cooled liners.

In gas turbine engines, gases are heated by mixing the gases with fuel and burning the mixture. The mixing and burning occurs in an annular combustion chamber formed between an annular inner liner and an annular outer liner. A dome at an upstream end of the combustion chamber has fuel nozzles which deliver fuel to the chamber and mixers which mix the fuel with the flowpath gases. Over time, the high temperatures and corrosive combustion gases damage the liners in the transpiration cooled region.

Early combustion chamber liners were made from sheet metal rings which were brazed together. These liners had recessed cooling holes spaced along the liners for introducing film cooling air to cool the liners. When these liners became damaged, the damaged rings were removed and replaced using a process generally identical to the process used to make the liners originally. More recently, transpiration cooled liners having thousands of small cooling holes have been used. Most of these liners are cast or made from forged rings which are welded together and machined to the final part shape. In the past, these liners have been discarded when they became extensively damaged.

SUMMARY OF THE INVENTION

Among the several features of the present invention may be noted the provision of a method of repairing an annular transpiration cooled liner for a combustion chamber of a gas turbine engine. An annular portion of the liner including a damaged region is removed from between an upstream section and a downstream section of the liner. Sheet metal is formed into an annular replacement section having at least one axial seam extending between an upstream end and a downstream end of the replacement section. The replacement section is sized and shaped similarly to the removed annular portion of the liner. The upstream end of the formed annular section is joined to the upstream section of the liner and the downstream end of the formed annular section is joined to the downstream section of the liner.

Other features of the present invention will be in part apparent and in part pointed out hereinafter.

BRIEF DESCRIPTION OF THE DRAWINGS

FIG. 3 is a section of the liner showing a damaged region removed;

FIG. 4 is a section of the liner showing the damaged region replaced; and

FIG. 5 is a section of the liner showing the replaced section after shaping.

Corresponding reference characters indicate corresponding parts throughout the several views of the drawings.

DETAILED DESCRIPTION OF THE PREFERRED EMBODIMENT

Figure 1:
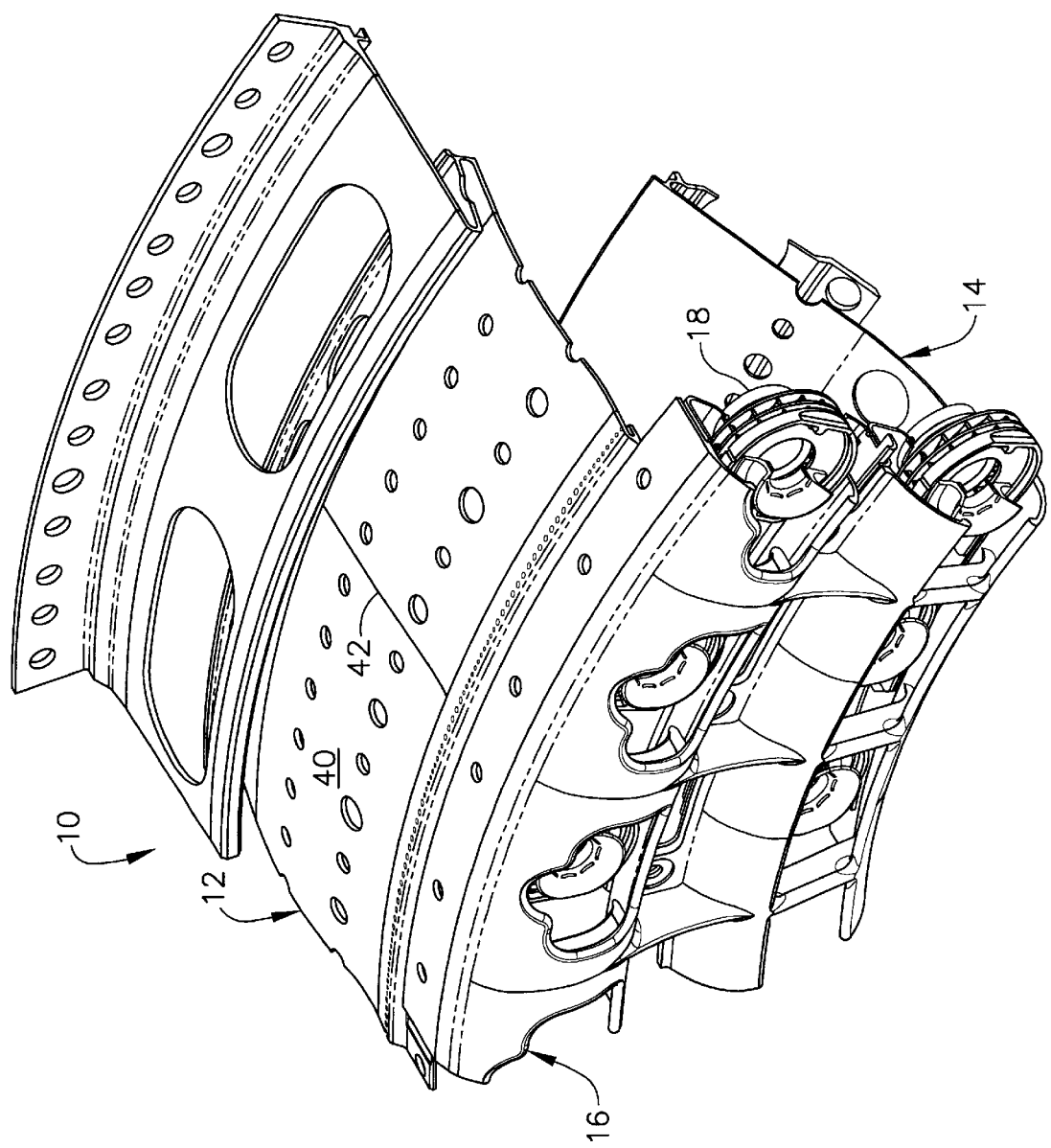
FIG. 1 is a partial perspective of a combustion chamber.

Referring now to the drawings and in particular to FIG. 1, a sector of an annular combustion chamber of a gas turbine engine is generally designated by the reference number 10. The chamber 10 includes an outer liner, generally designated by 12, and an inner liner, generally designated by 14, each of which may be repaired using the method of the present invention. The chamber 10 also includes a conventional dome, generally designated by 16, connected to the outer liner 12 and the inner liner 14 with fasteners (not shown). Fuel nozzles (not shown) are mounted upstream from the dome 16 for delivering fuel to the combustion chamber 10. Conventional mixers 18 are provided in the dome 16 for mixing the fuel with flowpath gases. As the chamber 10 is conventional in all respects, it will not be described in further detail.

Figure 2:
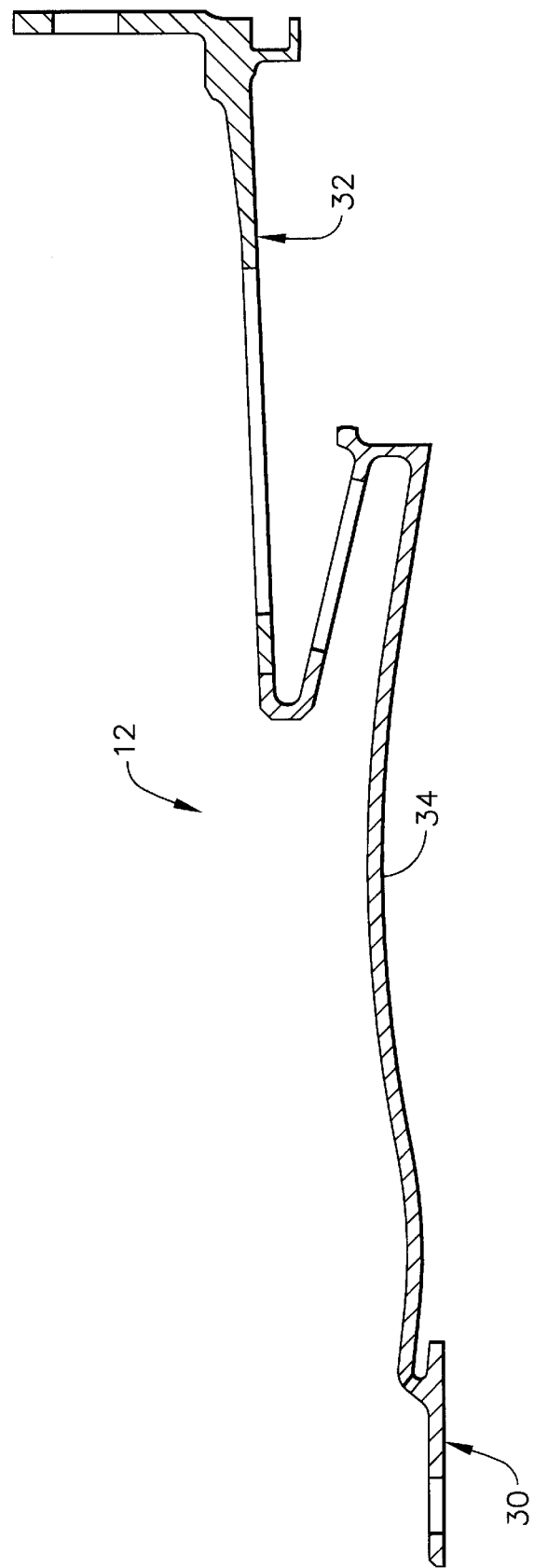
FIG. 2 is a vertical cross section of a damaged outer combustion chamber liner.

As illustrated in FIG. 2, the outer liner 12 generally comprises a forged annular upstream section 30 and an annular downstream section 32. These sections 30, 32 are concentric and surround a common centerline (not shown) which is coincident with a centerline of the gas turbine engine. When a region of the outer liner 12 is identified as being damaged (e.g., by visual inspection), an annular portion 34 of the liner including the damaged region is removed from between the upstream section 30 and the downstream section 32 of the liner as shown in FIG. 3. As will be understood by those skilled in the art, the annular portion 34 may be removed by a conventional machining process such as turning the liner 12 on a vertical turret lathe or cutting the liner 12 with a laser.

As illustrated in FIG. 4, sheet metal is formed into an annular replacement section 40 having at least one axial seam 42 (FIG. 1). The replacement section 40 may be formed by any conventional process such as roll forming. Although the circumferential ends of the sheet metal may be joined by other processes without departing from the scope of the present invention, in one preferred embodiment the ends are joined by electron beam welding. As further illustrated by FIG. 4, the replacement section 40 is sized and shaped similarly to the removed annular portion 34 of the liner 12. Although the sheet metal used to form the replacement section may have other thicknesses without departing from the scope of the present invention, in one preferred embodiment the sheet metal has a thickness substantially identical to the thickness of the removed portion 34 of the liner 12. The replacement section 40 has an upstream end 44 and a downstream end 46. The upstream end 44 of the annular replacement section 40 is joined to the upstream section 30 of the liner 12. The downstream end 46 of the annular replacement section 40 is joined to the downstream section 32 of the liner 12 so that features in the downstream section such as boltholes are properly oriented with respect to features is the upstream section of the liner. Although other processes may be used to join the ends 44, 46 of the replacement section 40 to the upstream and downstream sections 30, 32 of the liner 12 without departing from the scope of the present invention, in one preferred embodiment the replacement section is joined to the upstream and downstream sections of the liner by electron beam welding.

Either before or after the replacement section 40 is joined to the upstream and downstream sections 30, 32 of the liner 12, various conventional features may be machined into the replacement section. For example, cooling holes (not shown), dilution holes 50 (FIG. 1) and ignition interface features (not shown) may be machined into and attached to the replacement section. It is also envisioned that the positions and sizes of these holes and features can be modified if desired during this repair. Further, the repaired liner 12 may be heat treated using a conventional process to relieve stress in the liner. Moreover, the liner 12 may be positioned on a conventional mandrel or sizing shoes to adjust the size and/or shape of the replacement section 40 to closely resemble the size and shape of the original liner 12 as shown in FIG. 5. Although the replacement section 40 may be made of other materials without departing from the scope the present invention, the replacement section of the preferred embodiment is made of a conventional combustion chamber material. Further, although the replacement section 40 shown in the drawings contains substantially the entire transpiration cooled region of the liner 12, those skilled in the art will appreciate that the replacement section 40 may contain only a portion of the transpiration cooled region without departing from the scope of the present invention.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of repairing a damaged annular transpiration cooled liner of a gas turbine engine combustion chamber comprising the steps of:

removing an annular portion of the liner including a damaged region from between an upstream section and a downstream section of the liner;

forming sheet metal into an annular replacement section having at least one axial seam extending between an upstream end of the replacement section and a downstream end opposite said upstream end, the replacement section being sized and shaped similarly to said removed annular portion of the liner;

joining the upstream end of the formed annular replacement section to said upstream section of the liner; and joining the downstream end of the formed annular replacement section to said downstream section of the liner.

2. A method as set forth in claim 1 wherein the seam is formed by electron beam welding.

3. A method as set forth in claim 1 wherein the formed annular section is joined to said upstream section and to said downstream section by electron beam welding.

4. A method as set forth in claim 1 wherein the replacement section is permanently deformed to a final shape after being joined to the upstream section and the downstream section of the liner.

5. A method as set forth in claim 1 wherein the liner is heat treated after the replacement section is joined to the upstream section and the downstream section of the liner.

6. A method as set forth in claim 1 wherein cooling holes are machined in the liner after the replacement section is joined to the upstream section and the downstream section of the liner.

7. A method as set forth in claim 6 wherein the cooling holes are machined in the liner at different positions than cooling holes in the removed annular portion.

8. A method as set forth in claim 6 wherein the cooling holes are machined in the liner with different sizes than cooling holes in the removed annular portion.

* * * * *